April 12, 1949. P. E. ALLEN 2,467,001
SCUFF PAD FOR AUTOMOBILE FENDERS
Filed July 5, 1947
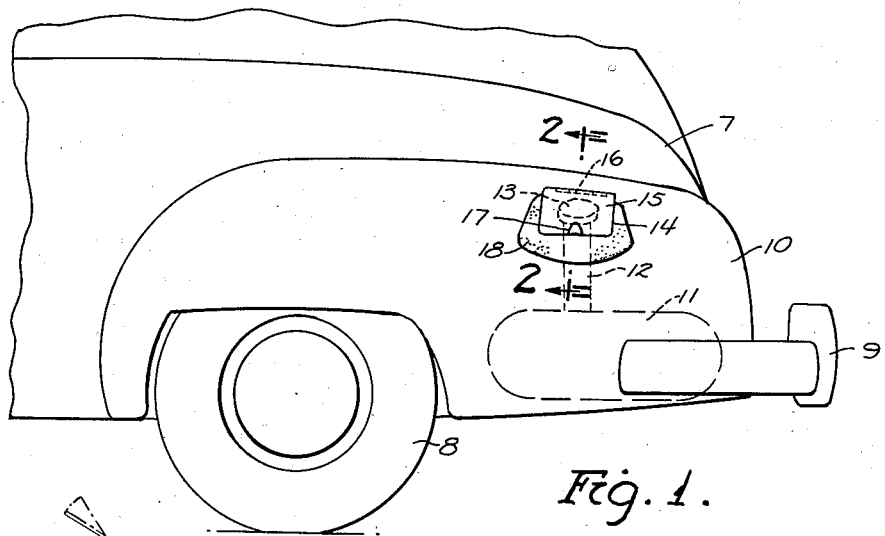
Fig. 1.
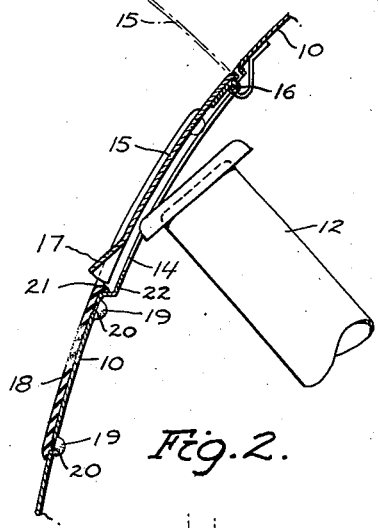
Fig. 2.
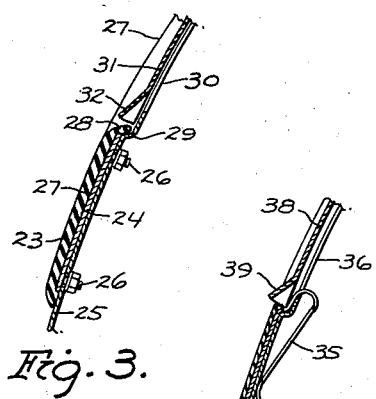
Fig. 3.
Fig. 4.
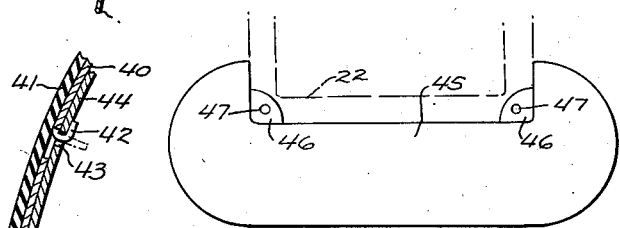
Fig. 5. Fig. 6.
INVENTOR.
Perry E. Allen
BY Edward M. Apple
ATTORNEY.

Patented Apr. 12, 1949

2,467,001

UNITED STATES PATENT OFFICE 2,467,001

SCUFF PAD FOR AUTOMOBILE FENDERS

Perry E. Allen, Pigeon, Mich.

Application July 5, 1947, Serial No. 759,141

2 Claims. (Cl. 280—153)

This invention relates to automotive vehicles, and has particular reference to an accessory for use on the fender of an automobile.

An object of the invention is to provide a scuff plate, or protective shield, for the automobile fender adjacent to the opening provided in the fender for the gas tank filler pipe.

In many conventional makes of automobiles, the gas tank is positioned beneath the rear of the automobile body, and the filler pipe for the tank is directed through an opening formed in the rear fender. In some makes of cars, the filler pipe extends through the fender, and is provided with a circular cap, which is positioned above the outside surface of the fender. In other types of automobiles, the filler cap is positioned below the level of the fender, and is made accessible through an opening formed in the fender, which opening is closed by a hinged plate, or the like. In either of such structures, the finish on the top surface of the rear fender in the area immediately surrounding the filler pipe opening is often times damaged by gas station attendants, who rest the handle of the gas pump nozzle on the fender.

It is an object, therefore, of this invention to obviate the foregoing difficulty, and to provide a protective shield for the area indicated, which shield may be incorporated as standard equipment on the automobile at the factory, or which may be applied to the fender as an accessory and as a decorative element.

The foregoing and other objects and advantages of the invention will become more apparent as the description proceeds, reference being made from time to time to the accompanying drawings, forming part of the within disclosure, in which drawings:

Fig. 1 is a fragmentary detail of the rear portion of an automobile showing a device embodying the invention in position on the left rear fender of an automobile.

Fig. 2 is a section taken substantially on the line 2—2 of Fig. 1.

Fig. 3 is a fragmentary sectional view of a modified form of the device.

Fig. 4 is a fragmentary sectional view of another modified form of the device.

Fig. 5 is a fragmentary sectional view of a further modified form of the device.

Fig. 6 is a plan view of a modified form of the device.

Referring now more particularly to the drawings, it will be understood that in the embodiment herein disclosed, the reference character 7 indicates the rear deck of a conventional automobile, having tire 8, rear bumper 9, and rear fender 10. In this embodiment, the gasoline supply tank 11 is positioned below the rear of the automobile body 7, and has a filler pipe 12 which extends upwardly from one end and terminates at a position beneath the underside of fender 10. The pipe 12 has a conventional removable cap 13, which covers the end of the pipe 12. The filler pipe 12 is made accessible through an opening 14 formed in the upper surface of the fender 10.

The opening 14 is covered by means of a plate 15, which is hinged to the fender, as at 16, and is provided with a finger lift 17.

The elements described so far are conventional parts of various types of automobiles, and form no part of the invention per se.

The invention resides in the provision of a protective plate 18 which may be made of metal or gasoline resisting synthetic plastic material, or any other suitable material.

The protective plate 18 is formed with a peripheral contour, which is pleasing to the eye, and its surface may be plated or provided with a soft resilient material, such as synthetic rubber, or the like. In the embodiment shown in Figs. 1 and 2, the protective element 18 is made entirely of synthetic rubber, and is provided on its underside with integrally formed ears 19, which are adapted to extend through apertures 20 formed in the fender 10, to serve as locking means. The member 18 has an inturned marginal edge 21 which closely engages the edge of the depressed portion 22 of the fender, in which the opening 14 is formed.

In Fig. 3 I show a modified form of the device in which the protective member 23 is formed of a metallic plate 24, which is secured to apertures in the fender 25 by means of bolts and nuts 26. In this embodiment, the plate 24 has vulcanized to it a rubber covering 27, the latter having an inturned edge 28, which extends over the end of the plate 24, and into the depressed portion 29 of the fender 25, in which the opening 30 is formed as previously described. In this embodiment, the reference character 31 indicates the hinged cover plate having the finger grip 32 as previously described.

In Fig. 4 I show a still further modification of the invention, in which embodiment the protective member 33 consists of a rubber covered metal plate 34 having integrally formed thereon spring clip members 35, which extend through the cutout portion 36, and engage the underside of the fender 37 to secure the member 33 in position.

In this embodiment, the reference character 38 indicates the closure plate having a finger grip 39 as previously described.

In Fig. 5 I show a still further modification of the invention, in which the protective member 40 comprises a metal plate covered with rubber 41, and provided with lanced ears 42, which extend through suitable openings 43 formed in the fender 44, and are bent into closely contacting position on the underside of the fender to serve as means for locking the protective element 40 in position.

In Fig. 6 I show in plan view a fragmentary detail of a portion of a modified form of protective plate, in which embodiment the protective plate 45 is provided with a depressed web like member 46, which is adapted to contact the edge of the depressed portion 22 (Fig. 2) of the fender 10, so that the protective plate 45 may be secured to the fender 10 by means of metal screws, or the like, which are extended through the apertures 47 formed in the web 46, and corresponding apertures formed in the depressed portion 22 (Fig. 2) of the fender 10, whereby the protective member 45 may be held securely in position.

Having described my invention, what I claim and desire to secure by Letters Patent is:

1. An article of manufacture adapted to serve as a protective shield for an automobile fender adjacent an opening in said fender, comprising a plate like member having a cut-out portion adapted to align with the cut-out portion of said fender, there being depressed webs on said plate arranged to contact depressed portions formed on said fender to assist in holding said plate in position.

2. An article of manufacture adapted to serve as a protective shield for an automobile fender adjacent an opening in said fender, comprising a plate like member having a cut-out portion adapted to align with the cut-out portion of said fender, there being at least one depressed web on said plate adapted to cooperate with a depressed portion formed on said fender, and apertures in said web adapted to accommodate fastening means.

PERRY E. ALLEN.

REFERENCES CITED

The following references are of record in the file of this patent:

UNITED STATES PATENTS

| Number | Name | Date |
|---|---|---|
| 581,977 | Clingman | May 4, 1897 |
| 1,480,274 | La Barre | Jan. 8, 1924 |
| 2,282,443 | Wilson | May 12, 1942 |
| 2,368,200 | Cavanagh | Jan. 30, 1945 |
| 2,417,324 | Rivard et al. | Mar. 11, 1947 |